(12) United States Patent
Huffstetler et al.

(10) Patent No.: US 10,910,802 B2
(45) Date of Patent: Feb. 2, 2021

(54) PEDESTAL ENCLOSURE FOR UTILITY COMPONENTS

(71) Applicant: Hubbell Incorporated, Shelton, CT (US)

(72) Inventors: Jeffrey Scott Huffstetler, Friendsville, TN (US); Robert Wilton Fox, Greenback, TN (US)

(73) Assignee: Hubbell Incorporated, Shelton, CT (US)

( * ) Notice: Subject to any disclaimer, the term of this patent is extended or adjusted under 35 U.S.C. 154(b) by 156 days.

(21) Appl. No.: 16/094,664

(22) PCT Filed: Apr. 20, 2017

(86) PCT No.: PCT/US2017/028568
§ 371 (c)(1),
(2) Date: Oct. 18, 2018

(87) PCT Pub. No.: WO2017/184838
PCT Pub. Date: Oct. 26, 2017

(65) Prior Publication Data
US 2019/0123533 A1    Apr. 25, 2019

Related U.S. Application Data

(60) Provisional application No. 62/325,141, filed on Apr. 20, 2016.

(51) Int. Cl.
*H02G 3/04* (2006.01)
*H02G 3/10* (2006.01)

(52) U.S. Cl.
CPC ............. *H02G 3/0493* (2013.01); *H02G 3/10* (2013.01)

(58) Field of Classification Search
CPC combination set(s) only.
See application file for complete search history.

(56) References Cited

U.S. PATENT DOCUMENTS

| | | | | |
|---|---|---|---|---|
| 2,808,135 A | * | 10/1957 | Moran | E04H 12/08 138/157 |
| 2,916,539 A | * | 12/1959 | Hamilton | H02G 15/076 174/38 |
| 2,916,591 A | * | 12/1959 | Benn | H02B 1/50 200/293 |
| 3,055,970 A | * | 9/1962 | Handley | C23F 13/04 174/37 |

(Continued)

OTHER PUBLICATIONS

PCT/US2017/028568 International Search Report and Written Opinion dated Jul. 21, 2017 (15 pages).

*Primary Examiner* — Binh B Tran
*Assistant Examiner* — Krystal Robinson
(74) *Attorney, Agent, or Firm* — Michael Best & Friedrich, LLP

(57) ABSTRACT

A pedestal housing for utility connections includes a lower section having a plurality of walls, an upper surface, and a bottom opening. A first rim is formed on the lower section positioned below the upper surface. A second rim is formed on the lower section positioned below the first rim. An upper section includes a plurality of walls and a top. The upper section is releasably connected to the lower section to form a housing for receiving one or more utility components. The upper section is configured to mate with one of the first rim or the second rim.

17 Claims, 6 Drawing Sheets

(56) References Cited

U.S. PATENT DOCUMENTS

| | | | | |
|---|---|---|---|---|
| 3,153,116 A * | 10/1964 | Phillips | H01H 85/2045 | 174/38 |
| 3,257,496 A * | 6/1966 | Hamilton | F21V 23/00 | 174/38 |
| 3,309,456 A * | 3/1967 | Connell | H02G 7/205 | 174/38 |
| 3,373,276 A * | 3/1968 | Klein | H02B 1/50 | 174/45 R |
| 3,435,124 A * | 3/1969 | Channell | H02G 15/10 | 174/38 |
| 3,652,779 A * | 3/1972 | Grinols | H01R 4/64 | 174/38 |
| 3,691,288 A * | 9/1972 | Sturdivan | H02B 1/50 | 174/38 |
| 3,714,369 A * | 1/1973 | Bunten | H02B 1/50 | 174/38 |
| 3,769,460 A * | 10/1973 | Charles | H01R 4/64 | 439/100 |
| 3,812,279 A * | 5/1974 | Voegeli | H02G 3/14 | 174/38 |
| 3,858,755 A * | 1/1975 | Tellen | H02G 9/10 | 220/284 |
| 3,928,712 A * | 12/1975 | Sears | H02G 15/06 | 174/38 |
| 4,015,397 A * | 4/1977 | Flachbarth | H02G 3/0493 | 52/713 |
| 4,097,683 A * | 6/1978 | Summers | G02B 6/4451 | 174/38 |
| 4,163,503 A * | 8/1979 | McKinnon | H02G 9/10 | 137/371 |
| 4,284,300 A * | 8/1981 | Campbell | F16B 41/005 | 292/251 |
| 4,365,108 A * | 12/1982 | Bright | H05K 5/03 | 174/37 |
| 4,382,155 A * | 5/1983 | Borin | H02G 9/00 | 174/38 |
| 4,415,217 A * | 11/1983 | Clabburn | H01R 31/02 | 439/488 |
| 4,519,657 A * | 5/1985 | Jensen | H02B 1/50 | 174/38 |
| 4,626,616 A * | 12/1986 | Masters | H02G 9/00 | 109/52 |
| 4,631,353 A * | 12/1986 | Marks | H02G 9/10 | 174/16.1 |
| 4,751,610 A * | 6/1988 | Nickola | H02B 1/50 | 174/38 |
| 4,873,600 A * | 10/1989 | Vogele | H02B 1/50 | 361/823 |
| 4,887,187 A * | 12/1989 | Nickola | H02B 1/50 | 361/664 |
| 4,892,978 A * | 1/1990 | Axworthy | H02G 9/10 | 174/38 |
| 5,184,279 A * | 2/1993 | Horn | H02B 1/50 | 174/38 |
| 5,196,988 A * | 3/1993 | Horn | H02B 1/50 | 174/38 |
| 5,210,374 A * | 5/1993 | Channell | G02B 6/4444 | 174/38 |
| D354,739 S * | 1/1995 | Durham | D13/184 | |
| 5,384,427 A * | 1/1995 | Volk | H02B 1/28 | 174/37 |
| 5,400,212 A * | 3/1995 | Hanson | H02B 1/03 | 174/38 |
| 5,401,902 A * | 3/1995 | Middlebrook | G02B 6/4451 | 174/37 |
| D367,464 S * | 2/1996 | Jones | D13/139.5 | |
| 5,611,616 A * | 3/1997 | Chandler | H02B 1/50 | 116/202 |
| 5,734,776 A * | 3/1998 | Puetz | G02B 6/4442 | 385/134 |
| 5,860,715 A * | 1/1999 | Lohde | A47B 45/00 | 174/50 |
| D434,001 S * | 11/2000 | Sayger | D13/139.5 | |
| 6,182,846 B1 * | 2/2001 | Leschinger | H02B 1/50 | 174/37 |
| 6,501,015 B2 * | 12/2002 | Maloney | H02G 3/0493 | 174/17 VA |
| 6,586,671 B1 * | 7/2003 | Kelley | H02G 9/10 | 174/38 |
| 6,877,886 B2 * | 4/2005 | Schuster | F21V 21/116 | 174/38 |
| 6,975,505 B2 * | 12/2005 | Wise | H02B 1/52 | 361/664 |
| 7,045,710 B1 * | 5/2006 | Allen | G02B 6/4442 | 174/38 |
| 7,351,909 B1 * | 4/2008 | Harwood | H02G 3/0493 | 174/37 |
| 7,357,009 B2 * | 4/2008 | Maloney | E05B 17/002 | 174/135 |
| 7,361,832 B2 * | 4/2008 | Dively | H02G 3/0493 | 174/37 |
| 7,385,137 B2 | 6/2008 | Burke et al. | | |
| 7,700,874 B2 * | 4/2010 | Maloney | H02B 1/50 | 174/38 |
| 7,807,924 B2 * | 10/2010 | Wurzer | H02G 3/0493 | 174/59 |
| 8,089,747 B2 * | 1/2012 | Storck | B60L 53/31 | 361/641 |
| 9,382,722 B2 * | 7/2016 | Banyi | E04H 12/2292 | |
| 9,768,592 B2 * | 9/2017 | Unger | H02B 1/28 | |
| 9,991,689 B2 * | 6/2018 | Drueke | H02G 3/081 | |
| 10,053,861 B2 * | 8/2018 | Lavery | H02G 3/0493 | |
| 10,158,221 B2 * | 12/2018 | Seff | G08B 5/36 | |
| 2001/0018978 A1 * | 9/2001 | Gordin | E04H 12/2253 | 174/2 |
| 2002/0096346 A1 * | 7/2002 | Maloney | H02G 3/0493 | 174/50 |
| 2005/0103780 A1 * | 5/2005 | Maloney | H02G 9/10 | 220/4.02 |
| 2005/0215090 A1 | 9/2005 | Harwood | | |
| 2005/0275319 A1 * | 12/2005 | Wittmeier | E04H 5/02 | 312/100 |
| 2005/0285011 A1 * | 12/2005 | Harwood | E04H 12/2261 | 248/519 |
| 2006/0090917 A1 | 5/2006 | Lowe et al. | | |
| 2006/0254794 A1 * | 11/2006 | Burke | H02G 3/185 | 174/38 |
| 2007/0182567 A1 * | 8/2007 | Stewart | A63B 71/0686 | 340/572.8 |
| 2008/0253061 A1 * | 10/2008 | Seff | H02B 1/50 | 361/622 |
| 2008/0253062 A1 * | 10/2008 | Seff | H02B 1/50 | 361/622 |
| 2009/0057119 A1 * | 3/2009 | Burkett | H01R 13/5202 | 200/332.1 |
| 2010/0051310 A1 * | 3/2010 | Wurzer | H02G 3/0493 | 174/59 |
| 2010/0052549 A1 * | 3/2010 | Hudson | E01F 9/617 | 315/156 |
| 2012/0256810 A1 * | 10/2012 | Caldwell | H01Q 1/1242 | 343/890 |
| 2012/0307069 A1 * | 12/2012 | Pierce | H04N 5/23238 | 348/159 |
| 2014/0196380 A1 | 7/2014 | Burke | | |

* cited by examiner

PEDESTAL ENCLOSURE FOR UTILITY COMPONENTS

RELATED APPLICATION(S)

This application is based on U.S. provisional application Ser. No. 62/325,141, filed Apr. 20, 2016, the disclosure of which is incorporated herein by reference in its entirety and to which priority is claimed.

FIELD

Various exemplary embodiments relate to pedestals for housing utility transmission components.

BACKGROUND

Utility grids such as power, communication, or water lines and metering components, require a network of components spread over large areas. At certain points in the network, enclosures and access points are required. For example, at different connection points it is important to provide access to a user or worker to service the connection or run additional lines from the connection point. Examples of typical enclosures include underground vaults and pedestals. Underground vaults provide in ground housing for components while pedestals are typically used for above ground housing and access.

SUMMARY

According to various exemplary embodiments, a pedestal housing for utility connections includes a lower section having a plurality of walls, an upper surface, and a bottom opening. A first rim is formed on the lower section positioned below the upper surface. A second rim is formed on the lower section positioned below the first rim. An upper section includes a plurality of walls and a top. The upper section is releasably connected to the lower section to form a housing for receiving one or more utility components. The upper section is configured to mate with one of the first rim or the second rim.

According to another exemplary embodiment, a base of a pedestal housing for utility connections includes a plurality of walls surrounding an interior and a bottom opening. An upper surface extends from the plurality of walls at least partially over the interior. A first rim is positioned below the upper surface and a second rim positioned below the first rim.

According to another exemplary embodiment, a pedestal housing for utility connections includes a base and a cover. The base includes a plurality of walls surrounding an interior and a bottom opening. An upper surface extends from the plurality of walls at least partially over the interior. A first rim is positioned below the upper surface. A second rim positioned below the first rim. The cover is configured to mate with the first rim or the second rim.

According to another exemplary embodiment, a pedestal housing product line for utility connections includes a base, a first cover, and a second cover. The base includes a plurality of walls surrounding an interior and a bottom opening. An upper surface extends from the plurality of walls at least partially over the interior. A first rim is positioned below the upper surface. A second rim is positioned below the first rim. A first cover is configured to mate with the first rim. A second cover is configured to mate with the second rim.

Another exemplary embodiment is directed to a method of installing a pedestal housing. A base is positioned to receive a utility component. The base includes a plurality of walls surrounding an interior and a bottom opening. An upper surface extends from the plurality of walls at least partially over the interior. A first rim is positioned below the upper surface, and a second rim is positioned below the first rim. A selection is made between one of a first cover and a second cover. The first cover has a first configuration and the second cover has a second configuration. The selected first or second cover is connected to the base.

Another exemplary embodiment is directed to a method of making a pedestal housing. A base is formed having, a plurality of walls surrounding an interior and a bottom opening, and an upper surface extending from the plurality of walls at least partially over the interior. A first rim is formed below the upper surface, and a second rim is formed below the first rim. A first cover configured to mate with the first rim is formed. A second cover configured to mate with the second rim is formed.

BRIEF DESCRIPTION OF THE DRAWINGS

The aspects and features of various exemplary embodiments will be more apparent from the description of those exemplary embodiments taken with reference to the accompanying drawings, in which.

DETAILED DESCRIPTION OF EXEMPLARY EMBODIMENTS

Figure 1:
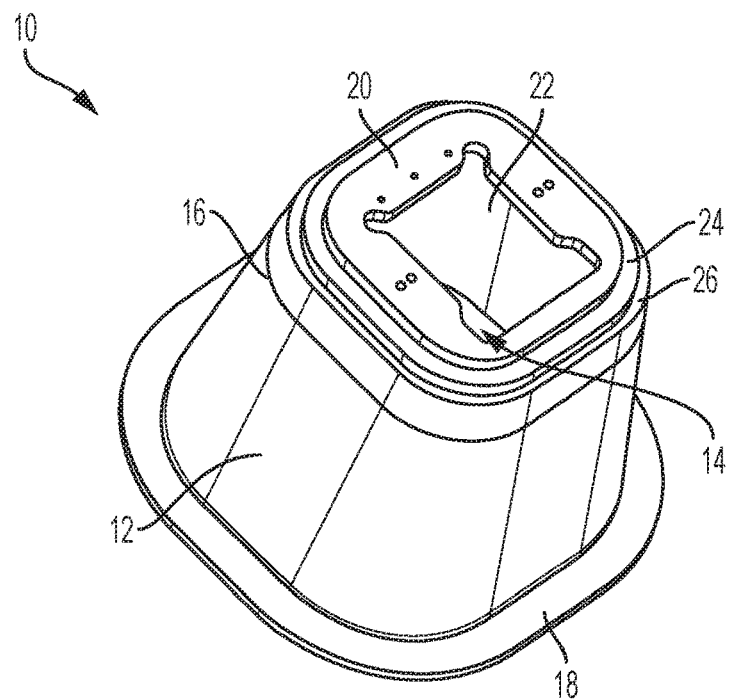
FIG. 1 is a top perspective view of an exemplary pedestal base.
Figure 2:
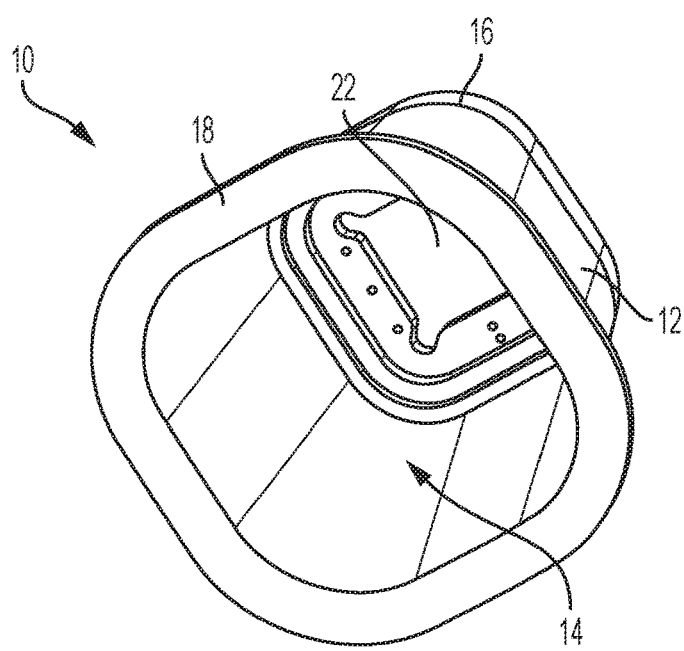
FIG. 2 is a bottom perspective view of FIG. 1.
Figure 3:
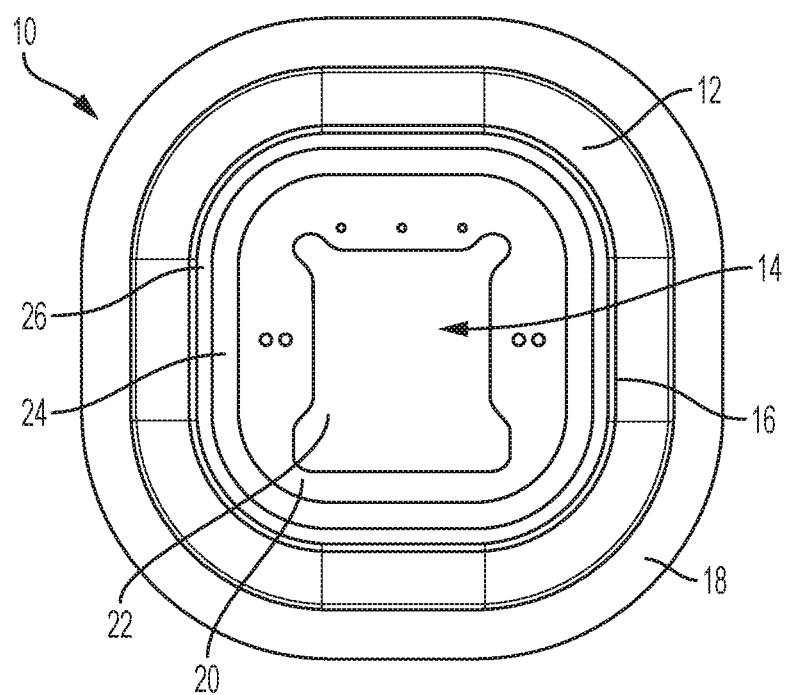
FIG. 3 is a top view of FIG. 1.
Figure 4:
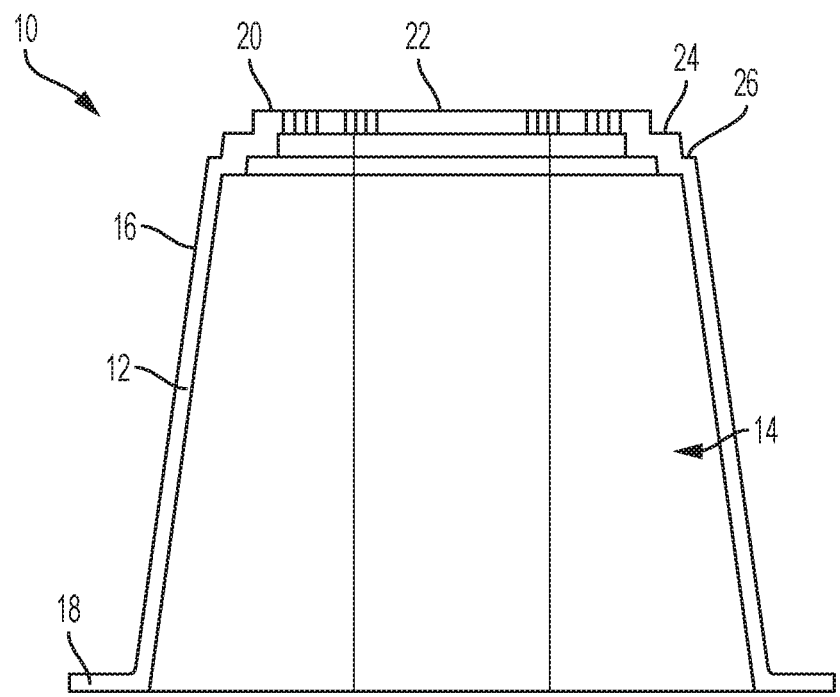
FIG. 4 is a side, sectional view of FIG. 1.

FIGS. 1-6 show exemplary embodiments that can be incorporated into a pedestal configured to contain various utility components. The pedestal can be secured to the ground or connected to another structure, such as an underground vault. Pedestal housings can be entirely above ground or recessed in the ground and extending therefrom. According to an exemplary embodiment, the pedestal includes a base 10 and a cover 12 that form a housing.

FIGS. 1-4 show an exemplary embodiment of a base 10. The base 10 includes a plurality of side walls 12 having rounded corners that surround an interior 14. A bottom opening provides access to the interior 14 from below, allowing utility lines to be run into the base 10. A groove 16 is formed around the side walls 12. A flange 18 extends from a lower portion of the side walls 12. The base 10 includes an upper surface 20 and a central opening 22 that provides access to the interior 14. The upper surface 20 includes one or more mounting features, for example openings, for connecting components to the base 10. In various exemplary embodiments, the number of side walls 12 can vary and can include a single, curvilinear side wall 12. The size, shape, and configuration of the base 10 can vary depending on the desired usage, for example taking into consideration space and load requirements. The base 10 can be made from a material that includes a polymer, such as a thermoplastic, concrete, a polymer-concrete blend, fiberglass or other suitable materials. The base 10 can be formed through a molding or casting procedure.

In an exemplary embodiment, the base 10 includes a first rim 24 and a second rim 26. The first rim 24 is positioned below the upper surface 20 and positioned above the second rim 26. The second rim 26 extends out from the first rim 24 in a stepped fashion to be wider than the first rim 24. Typically a pedestal base is designed to work with a single type and size of cover. The first and second rims 24, 26 allow the base 10 to accommodate different types of covers and different types of interior components than could be used in other pedestals. The first and second rims 24, 26 receive various covers and help prevent objects and debris from entering the housing.

Figure 5:
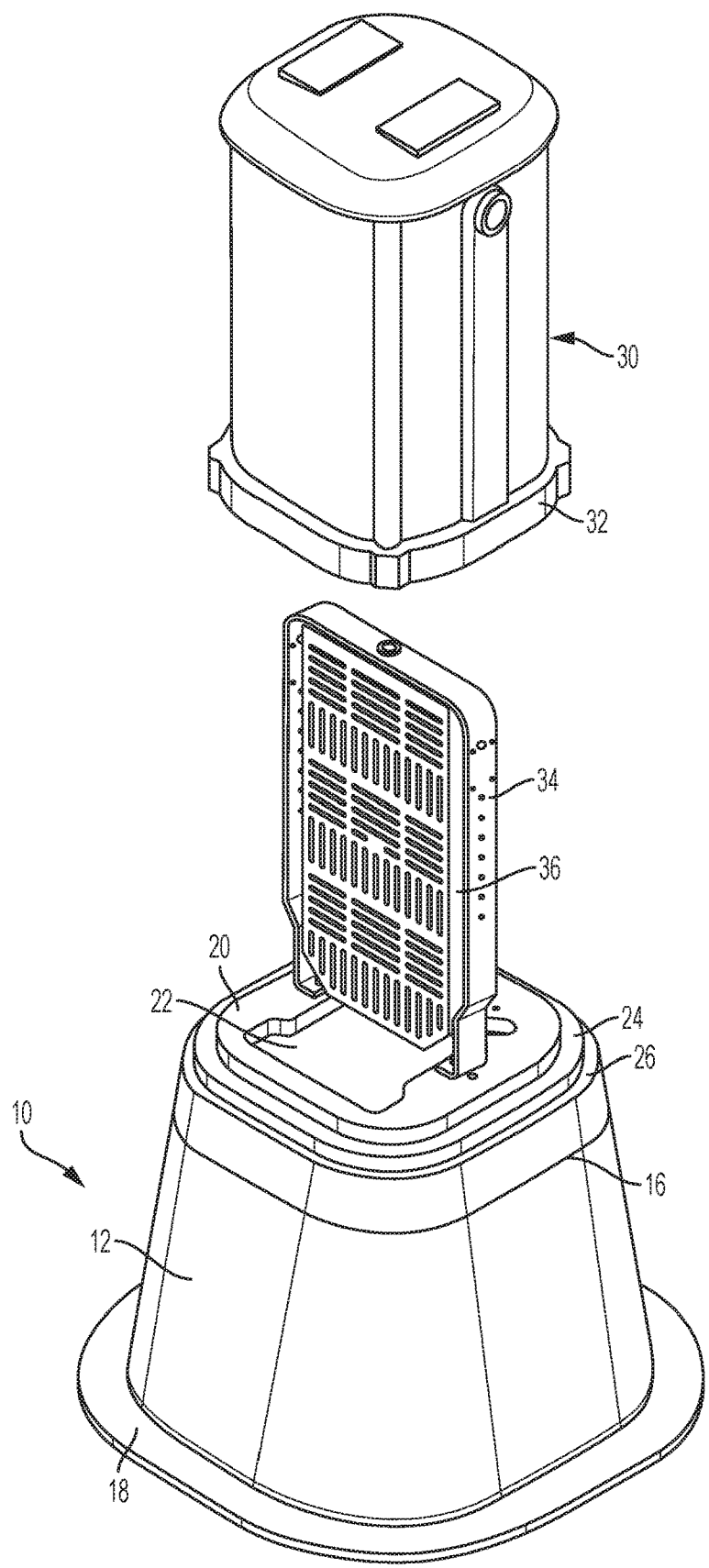
FIG. 5 is a perspective view of the base of FIG. 1 and a first exemplary cover.
Figure 6:
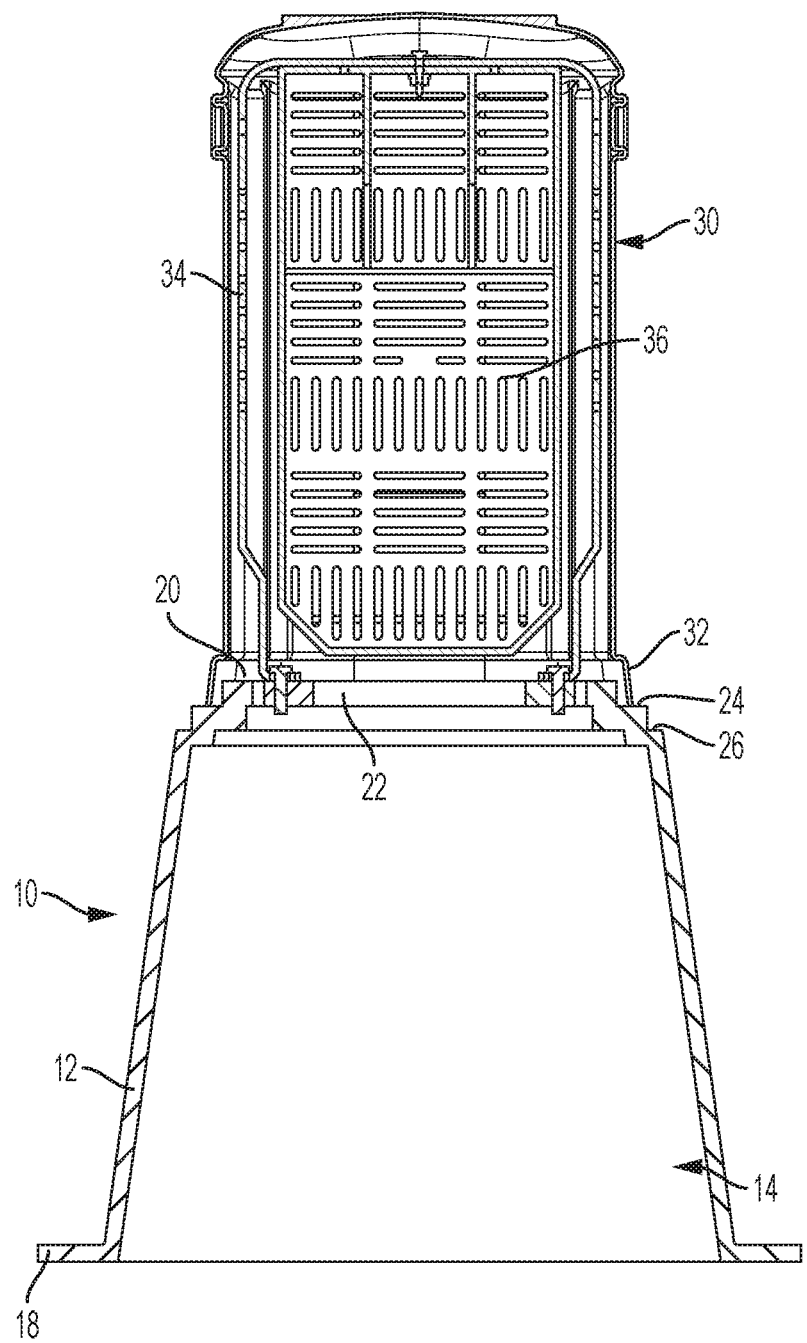
FIG. 6 is a side, sectional view of FIG. 5 with the cover connected to the base.

FIGS. 5 and 6 show an exemplary embodiment of a first cover 30 and a set of components connected to the base 10. The first cover 30 includes a bottom lip 32 designed to mate with the first rim 24 of the base. The components include a bracket 34 and an insert 36. Other accessories can be incorporated as would be understood by one of ordinary skill in the art. The bracket 34 connects to the upper surface 20 of the base 10, for example through one or more fasteners. In an exemplary embodiment, the insert 36 includes a mounting plate that receives one or more utility connectors, for example terminal blocks or splitters. The first cover 30 can be made from a material that includes polymer, such as a thermoplastic, concrete, a polymer-concrete blend, fiberglass or other suitable materials. The first cover 30 can be formed through a molding or casting procedure, for example rotational molding.

Figure 7:
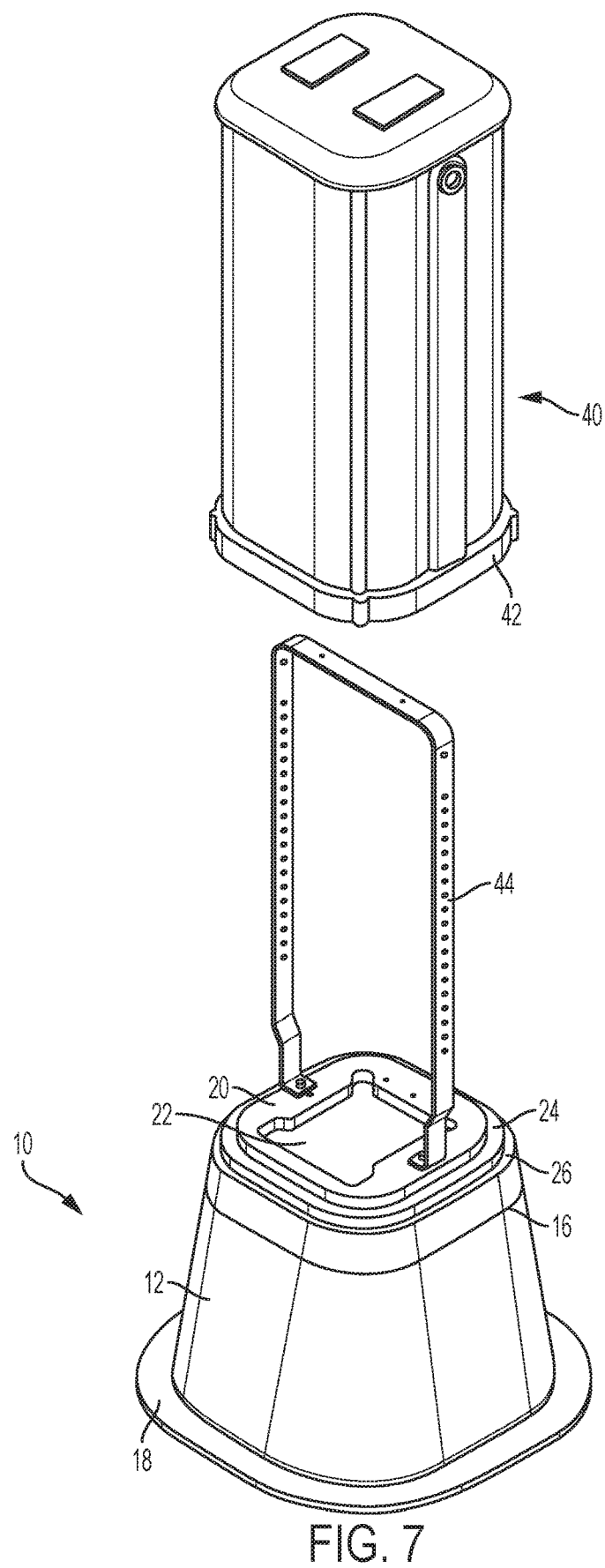
FIG. 7 is a perspective view of the base of FIG. 1 and a second exemplary cover.
Figure 8:
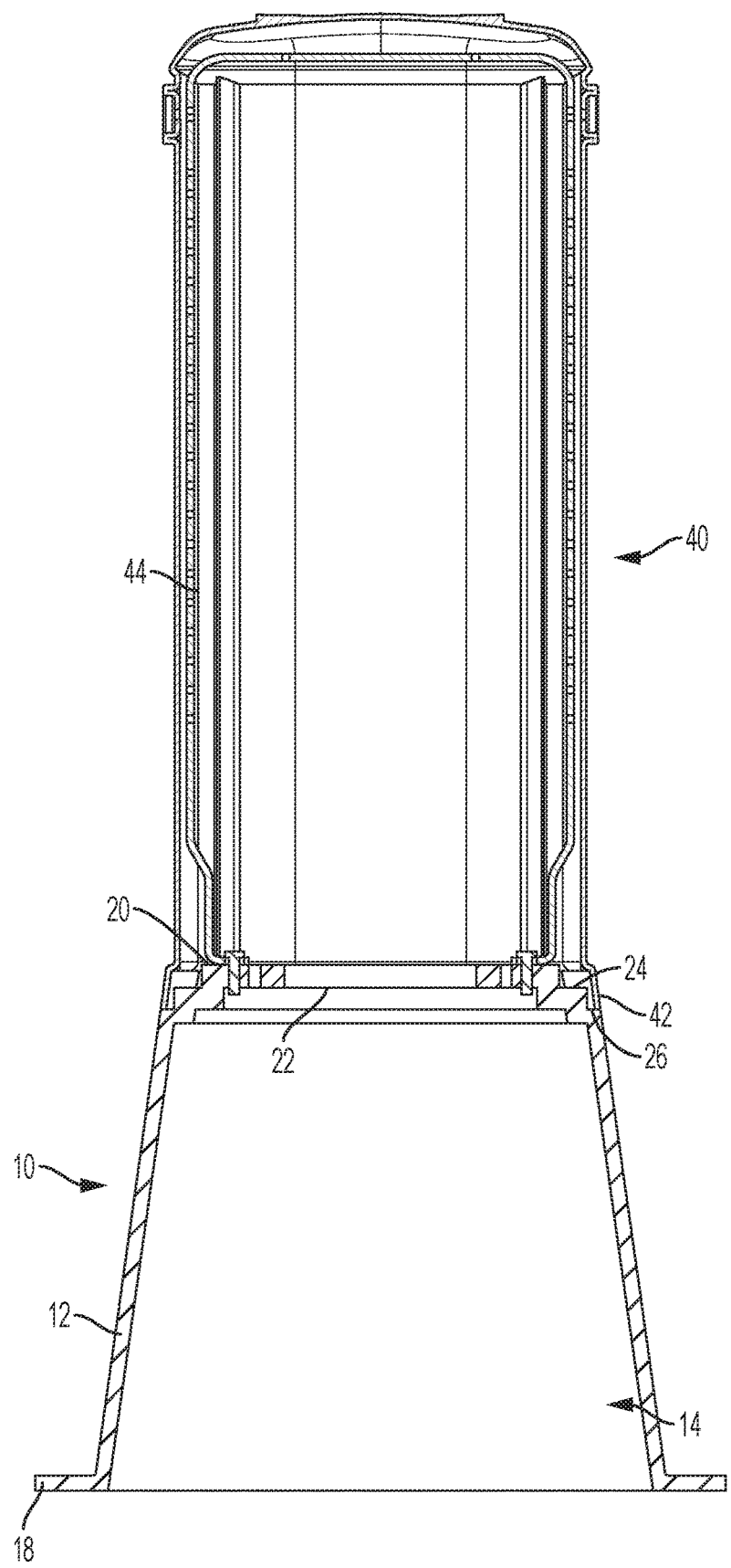
FIG. 8 is a side, sectional view of FIG. 7 with the cover connected to the base.

FIGS. 7 and 8 show an exemplary embodiment of a second cover 40 and a set of components connected to the base 10. The second cover 40 includes a bottom lip 42 designed to mate with the second rim 26 of the base. Although only a bracket 44 is shown, other accessories can be incorporated as would be understood by one of ordinary skill in the art. The bracket 44 connects to the upper surface of the base, for example through one or more fasteners. The second cover 40 can be made from a material that includes a polymer, such as a thermoplastic, concrete, a polymer-concrete blend, fiberglass or other suitable materials. The second cover 40 can be formed through a molding or casting procedure, for example rotational molding.

In an exemplary embodiment, the first cover 30 shown in FIG. 5 has a first width and the second cover 40 shown in FIG. 6 has a second width that is greater than the first width. For example, the first cover 30 can have a 10 inch width and the second cover 40 can have a 12 inch width. The first cover 30 can be configured to mate with the first rim 24 while the second cover 40 is configured to mate with the second rim 26.

According to an exemplary embodiment the base 10 is made from polymer concrete, the first and second covers 30, 40 are made from polyethylene, for example low-density polyethylene (LDPE), and the brackets 34, 44 are made from aluminum. Because the base 10 is made from polymer concrete, more interior room space is provided, allowing for storage of slack cable or similar application in the fiber optic, telephone, or electric utility industries. The base 10 is also capable of being installed so that up to 4-inches of the base can be left above grade level, allowing for protection of the pedestal from damage caused by mowing equipment.

In various exemplary embodiments, other parts and accessories can be associated with the pedestal as would be understood by one of ordinary skill in the art. For example a lock mechanism may be provided between the cover and the base. Different types of inserts and connectors other than the ones shown may also be used.

Various exemplary embodiments are directed to methods of making and installing a pedestal. The base 10 can be formed to include a plurality of side walls 12, an upper surface 20, a first rim 24, and a second rim 26. In an exemplary embodiment the base 10 can be formed from molding or casting. The base 10 can be installed on or in a surface, for example the ground or on top of an underground enclosure. A first cover 30 having a first configuration and a second cover 40 having a second configuration are provided and one of the first cover 30 and the second cover 40 is selected and connected to the base 10. The first rim 24 of the base 10 can be configured to mate with the first cover 30 and the second rim 26 can be configured to mate with the second cover 40. The base 10 and cover 30, 40 form a housing and one or more interior components can be connected to, or positioned in the housing. For example a bracket 34 can be connected to the base 10 and a mounting plate can be connected to the bracket 10. A utility line, for example an electrical conductor or fiber optic line can be run into the base 10 through the bottom opening and connected to the mounting plate through a terminal block or splitter. One or more secondary conductors can also be connected to the mounting plate.

The foregoing detailed description of the certain exemplary embodiments has been provided for the purpose of explaining the principles of the invention and its practical application, thereby enabling others skilled in the art to understand the invention for various embodiments and with various modifications as are suited to the particular use contemplated. This description is not necessarily intended to be exhaustive or to limit the invention to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms "front," "rear," "upper," "lower," "upwardly," "downwardly," and other orientational descriptors are intended to facilitate the description of the exemplary embodiments of the present invention, and are not intended to limit the structure of the exemplary embodiments of the present invention to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments.

What is claimed:

1. A pedestal housing for utility connections comprising:
   a lower section having a plurality of walls, an upper surface, and a bottom opening;
   a first rim formed on the lower section positioned below the upper surface;
   a second rim formed on the lower section positioned below the first rim;
   a first upper section having a plurality of walls and a top, the first upper section configured to be releasably connected to the lower section to form a housing for receiving one or more first sets of utility components, the first upper section configured to mate with the first rim, wherein the first upper section encloses the upper surface when connected to the first rim; and a second upper section having a plurality of walls and a top, the second upper section configured to be releasably connected to the lower section to form a housing for receiving one or more second sets of utility components, the second upper section configured to mate with the second rim, wherein the second upper section encloses the upper surface when connected to the second rim.

2. The pedestal housing of claim 1, wherein a flange extends from a lower portion of the walls.

3. The pedestal housing of claim 1, wherein a groove is formed around the plurality of walls.

4. The pedestal housing of claim 1, wherein the upper surface includes one or more mounting features.

5. The pedestal housing of claim 1, wherein the first upper section includes a first cover having a bottom lip configured to mate with the first rim.

6. The pedestal housing of claim 5, wherein the upper section further includes a bracket and an insert.

7. The pedestal housing of claim 6, wherein the bracket is connected to the upper surface and the insert is connected to the bracket.

8. The pedestal housing of claim 6, wherein the insert includes a mounting plate configured to receive one or more utility connectors.

9. The pedestal housing of claim 1, wherein the second upper section includes a second cover having a bottom lip configured to mate with the second rim.

10. A pedestal housing for utility connections comprising:
a base comprising,
    a plurality of walls surrounding an interior and a bottom opening,
    an upper surface extending from the plurality of walls at least partially over the interior and defining a central opening,
    a first rim positioned below the upper surface, and
    a second rim positioned below the first rim in a stepped configuration;
a first cover configured to mate with the first rim, wherein the first cover encloses the upper surface and the central opening when connected to the first rim; and
a second cover configured to mate with the second rim, wherein the second cover encloses the upper surface and the central opening when connected to the second rim.

11. The pedestal housing of claim 10, wherein the first cover includes a bottom lip configured to mate with the first rim.

12. The pedestal housing of claim 10, further comprising a bracket connected to the upper surface and an insert connected to the bracket.

13. The pedestal housing of claim 12, wherein the insert includes a mounting plate configured to receive one or more utility connectors.

14. The pedestal housing of claim 10, wherein the second cover includes a bottom lip configured to mate with the second rim.

15. The pedestal housing of claim 10, wherein a flange extends from a lower portion of the plurality of walls.

16. The pedestal housing of claim 10, wherein the upper surface includes a set of openings fastener openings positioned around the central opening.

17. The pedestal housing of claim 16, wherein a bracket is connected the upper surface by one or more fasteners extending through the fastener openings.

* * * * *